(No Model.) 3 Sheets—Sheet 1.

N. O. STARKS & J. A. JOHNSON.
CORN PLANTER.

No. 303,066. Patented Aug. 5, 1884.

Witnesses:
Albert H. Adams
D. P. Cowl

Inventors.
Nils O. Starks
John A. Johnson
by West & Bond
Their Attorneys

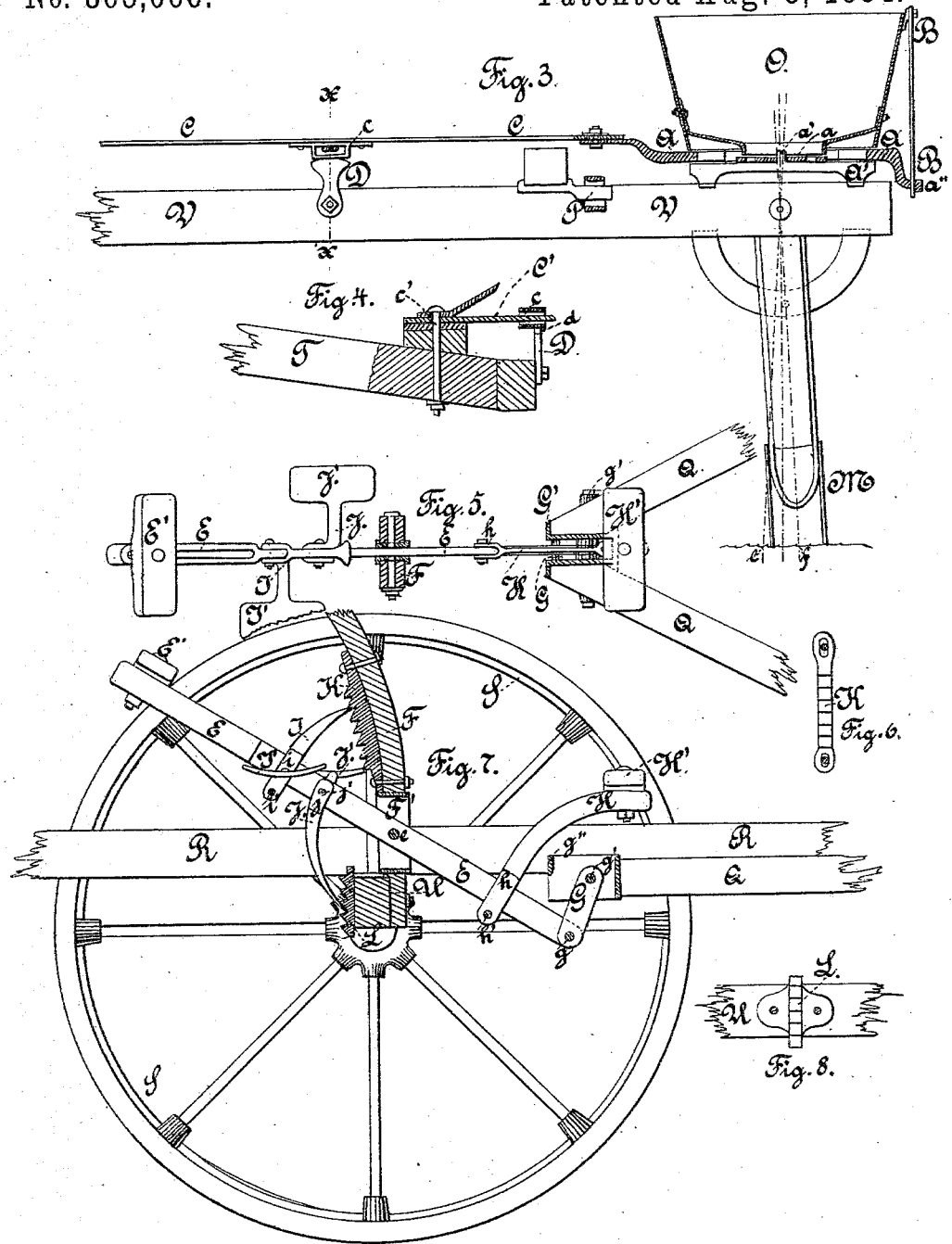

(No Model.) 3 Sheets—Sheet 3.

N. O. STARKS & J. A. JOHNSON.
CORN PLANTER.

No. 303,066. Patented Aug. 5, 1884.

Fig. 9.

Fig. 10.

WITNESSES:
Albert H. Adams.
D. P. Cowl

INVENTORS
Nils O. Starks
John A. Johnson
BY West & Bond
Their ATTORNEYS.

United States Patent Office.

NILS O. STARKS AND JOHN A. JOHNSON, OF MADISON, WISCONSIN, ASSIGNORS TO FULLER & JOHNSON MANUFACTURING COMPANY, OF SAME PLACE.

CORN-PLANTER.

SPECIFICATION forming part of Letters Patent No. 303,066, dated August 5, 1884.

Application filed January 31, 1884. (No model.)

*To all whom it may concern:*

Be it known that we, NILS O. STARKS and JOHN A. JOHNSON, residing at Madison, in the county of Dane and State of Wisconsin, and citizens of the United States, have invented certain new and useful Improvements in Corn-Planters, of which the following is a full description, reference being had to the accompanying drawings, in which—

Figure 1:
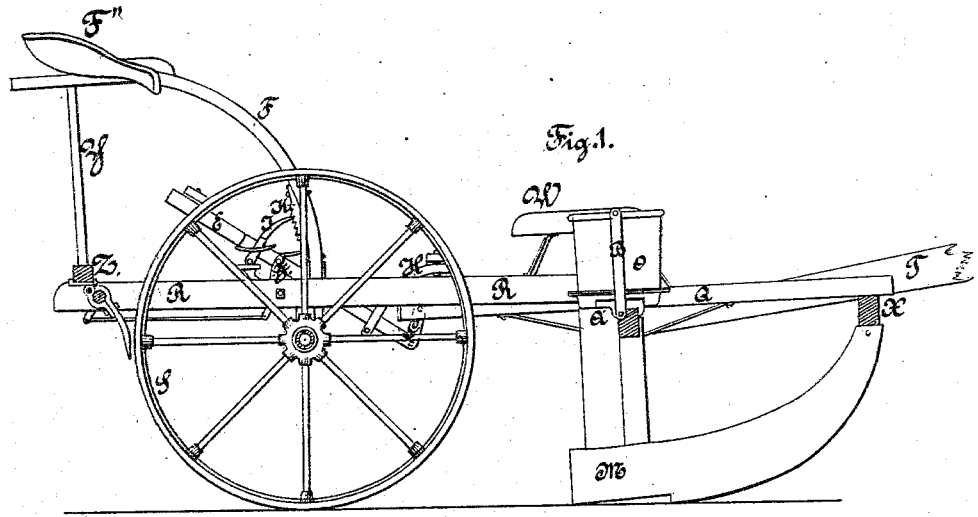
Figure 2:
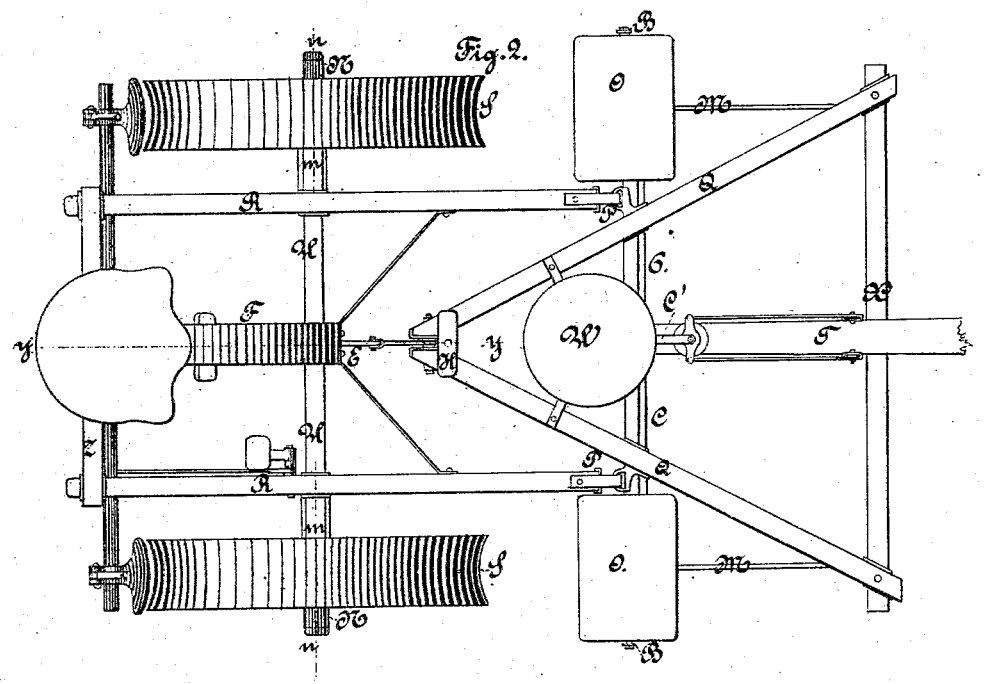

Figure 1 is a side elevation with the tongue broken off; Fig. 2, a top or plan view with the tongue broken off; Fig. 3, a detail showing the seed-box in section and the seed-tube, supporting-bar, and slide-operating bar in elevation; Fig. 4, a detail, being a cross-section through the pivot supporting the reciprocating bar which operates the seed-slides; Fig. 5, a detail of the devices for elevating and locking in position, when elevated, the front or runner section of the planter; Fig. 6, a detail of the upper locking-ratchet; Fig. 7, a section on line $y\ y$ of Fig. 2, showing the devices for elevating and locking the front or runner section and the devices for locking the front or runner section against a rising or falling movement; Fig. 8, a detail showing the lower locking-ratchet; Fig. 9, a longitudinal section through the wheel-hub, and Fig. 10 a sectional elevation showing the machine with the front or runner section in its elevated position, the section being taken on line $y\ y$ of Fig. 2.

This invention relates to that class of corn-planters having a front or runner section carrying the seed-boxes and dropping devices, and a rear or wheel section on which the driver or operator is mounted, the wheels of which rear section form coverers by which the dropped corn is covered by the earth, and has for its objects to improve the construction and operation of the seed-dropping devices, and give such devices perfect freedom of movement in operation, with but very little, if any, friction; to improve the devices by which the front or runner section is thrown up and held in its elevated position; to enable the front or runner section to be locked against vertical movement in either direction, or be allowed to rise or fall, as may be required for the condition of the ground; to enable the distance apart of the rows to be readily and quickly changed by simply changing the runners from one side to the other, and having the wheels constructed to be changed likewise to conform to the change in the runners, so as to follow the runners and cover the seed, and to improve generally the construction and operation of the several parts composing the planter; and its nature consists in the several devices and combinations of devices for attaining the objects sought, which are hereinafter more specifically described, and pointed out in the claims as new.

In the drawings. A represents the seed-slides, one for each seed-box, which seed-boxes are located one on each side of the machine. Each slide A is located above a casting or support, A', which casting, at its center, is provided with a pivot, $a'$, on which the dropping-plate $a$ turns as the slide A is reciprocated back and forth, the dropper-plate $a$ having a series of holes or seed-cups, as usual, to be filled with the seed that is to be dropped.

B represents hanger bars or straps secured at their upper ends in any suitable manner to the upper end of the seed-box, and connected at their lower end with the projecting end $a''$ of the seed-slide A, so as to support and suspend such slide free of the base or supporting plate A', a bar or strap, B, being located on the outer end of each seed-box, as shown in Figs. 1, 2, and 3, or on both ends.

C is the reciprocating bar for operating the slides A, to the inner end of which slides the ends of the bar are connected by bolts or otherwise, as shown in Fig. 3. This bar C extends from slide to slide, and at its center is provided with a stirrup, $c$, which receives the end of a vibrating arm, C', by which the bar C is reciprocated, the arm C' being operated in any usual and well-known manner.

D is a support, pivoted at its lower end, as shown, to the cross-bar, which supports the seed-boxes, and having its upper end, $d$, curved, as shown, and in contact with the stirrup $c$ of the reciprocating bar C, by which means the bar C is supported at this point on a rocking support. This rocking support D holds the reciprocating bar up at the center, so that it is free to move back and forth, and the slides being supported at their ends, it will be seen that but little, if any, friction occurs in the reciprocating movement of these parts, the result being that in use the slides are easily operated, will not wear out readily, as there is no friction to produce wear, the parts will remain much longer in proper working condition, and any dust or dirt which may enter or lie on the parts will not interfere with the free movement, as the rocking support or pivot D furnishes a support by which the bar is free to move back and forth under all conditions. As shown, the vibrating arm C′ extends forward, and is pivoted by a bolt, c′, to a support on the rear end of the tongue; but it could be pivotally attached in some other manner.

E is a foot treadle or lever, pivoted at e in a suitable support mounted on the axle of the rear or wheel section of the planter, and having at its rear end a foot-rest, E′, by which the operator with his feet can throw the lever up at its front end, as shown in Fig. 10.

F represents a curved standard, secured at its lower end in any suitable manner to the support F′, in which the foot-lever E is pivoted, and having mounted on its upper end a seat, F″, on which the operator rides, which seat is located in such relation to the rear end of the foot-lever as to enable the operator to place his foot on the cross-piece E′ and operate the lever E.

G is a link, connected at its rear end by a suitable pin or pivot, g, to the front end of the lever E, and connected at its front end by a suitable pin or pivot, g′, to a connection, G′, on the front or runner section of the planter, which connection G′ has its rear side, g″, partly cut off, so as to form a rest, which comes in contact with the upper edge of the link or strap G when the front section of the planter is elevated, and forms a lock by which the front section is maintained in its elevated position, and this lock is automatic by reason of the pivotal points of the link or strap passing the center when the lever E is raised, as shown in Fig. 10, the result being that the front or runner section is locked in its elevated position by the simple act of lifting it without the use of any other locking devices than the lever and link or strap by which it is raised.

H is a standard secured at its lower end in any suitable manner to the lever E forward of its pivot, and having at its upper end a cross-piece, H′, on which the driver or operator can place his foot, and by bearing down throw the forward end of the lever E down, dropping the front or runner section of the planter into position for use. As shown, the standard H has a fork, h, at its lower end, which straddles the lever E, and by means of which and a suitable bolt, h′, the standard is attached to the lever.

I is a pawl or latch pivotally mounted on the lever E at the rear of the pivot e, and extending upward from such lever. As shown, this pawl or latch I, at its lower end, is provided with a fork, i, which straddles the lever, and is pivotally attached thereto by a suitable pin or pivot, i′, and, as shown, on one side of this fork i is a foot-piece, I′, on which the operator can place his foot and throw the pawl out of or into engagement.

J is a pawl or latch pivotally mounted on the arm or lever E at the rear of the pivot e, and hanging down from such lever. As shown, this pawl or latch, at its upper end, is provided with a fork, j, which straddles the lever E, and is pivotally connected to the lever by a suitable pin or pivot, j′, and, as shown, one arm or side of this fork j is provided with a foot-piece, J′, on which the driver can place his foot and throw the pawl or latch out of or into engagement.

K is a notched plate secured in any suitable manner to the under side of the seat-support F, and so located in relation to the pawl or latch I as to have the end of such pawl or latch engage with the serrations or notches k of the plate.

L is a notched plate secured in any suitable manner to the rear face of the axle of the rear or wheel section of the planter, and so located in relation to the pawl or latch J as to have the free end of such pawl or latch engage with the notches or serrations l of the plate L. The pawls or latches I and J, in connection with the ratchet-plates K and L, form locks by which the front or runner section of the planter can be locked and held in any desired position. If both pawls or latches are engaged with their respective ratchet-plates, the front section will be locked and held firmly and rigidly in whatever position it may be placed, and will plant at a uniform depth on level ground. If the upper pawl or latch, I, is alone engaged with its ratchet-plate K, with the lower pawl or latch disengaged, the front section of the planter is free to rise, but cannot fall or run lower than the point at which it is held by the pawl or latch, by which means the planter can be run and operated on soft ground, planting the corn at the required depth, while if it were not locked by the pawl or latch the planting would be liable to be too deep by reason of the runners cutting into the soft ground. When the lower pawl or latch, J, is engaged with its ratchet-plates L and the upper pawl or latch is disengaged, the front section of the planter is free to fall, but cannot rise above the point at which it is locked, by which means the front section is free to follow the inequalities in the ground, and to drop into dead furrows and other depressions without interfering with or changing the depth of planting, and if both pawls or latches I and J are left disengaged from their ratchet-plates the front section of the planter is free to rise and fall, as may be required to suit the lay of the ground, and when so disengaged the operator can readily force the runners into the ground by placing his foot on the treadle H H′ and pressing down on the lever E, and the front section, when the pawls or latches are disengaged, can be easily raised by the operator by placing his foot on the cross-piece E' and pressing down on the lever E. It will be seen that by using foot-treadles, and by having the pawls or latches I and J also operated by the foot of the operator, both hands of the operator or driver are left free to guide the team, as hand-levers, which have heretofore been used for the purpose of raising and lowering the front section of the planter, are dispensed with.

M are the runners, one for each side of the machine, and connected at the heel by a tube or heel piece, M', with the seed-box, so as to allow the seed to pass from the seed-box, and to drop at the rear or heel of each runner into the furrow which the body of the runner cuts. Each runner is set at a slight angle in relation to the horizontal plane of the seed-box, as shown in Fig. 3, and when the runners are set, as shown in Fig. 3, the rows are planted at the greatest distance apart; but the distance at which the rows are planted apart can be varied, to do which all that is necessary is to change the runners from one side to the other, which throws the incline in the opposite direction from that shown in Fig. 3, bringing the runners closer together, and this change can be quickly made by unbolting the runners, changing them, and securing them again in position; and it will be seen that by thus placing or setting the runners at a slight angle the same planter, by simply changing the runner from one side to the other, can be made to plant rows at different distances apart.

N represents the wheel-hubs, each of which is formed to have one side, $m$, longer than the other side, $n$, the object being to reverse the wheel to conform to the set of the runners M, and have the tread follow directly behind the runners. When the runners are set to plant at the greatest distance apart, the longest side, $m$, of the wheel-hub is on the inside, and when the runners are set to plant at the narrowest distance the hubs are changed to bring the shorter side, $n$, on the inside.

O represents the seed-boxes, one on each side of the machine, as usual.

P represents the hinges or couplings connecting the front and rear sections of the planter.

Q represents diagonal bars forming a portion of the frame-work of the front section, and to the rear ends of which is connected or attached the frame or connection for the front end of the strap or link G.

R represents the connecting bars or pieces attached to the axle of the rear section of the planter, and furnishing at their front ends the attachment for the hinges by which the two frames are pivotally connected together.

S represents the carrying-wheels for the rear section of the planter, provided with hubs N, as already described, to cause the wheels to follow the runners.

T is the tongue attached at its rear end to the front or runner section of the planter, as usual.

U is the axle for the rear or wheel section of the planter, supporting the bars R and the seat-standard and seat.

V is the cross-bar of the front or runner frame, on which the seed-boxes O are mounted, as usual.

W is the seat on which the dropper sits and operates the vibrating arm or lever C', to reciprocate the bar C and work the dropping devices.

X is the front cross-bar of the runner-frame, extending from end to end of the diagonal bars or braces Q.

Y is a standard or post supporting the rear end of the seat-standard F.

Z is a cross bar on the rear ends of the bars R, extending from bar to bar, and furnishing the support for the standard T.

The corn or seed is dropped from the seed-boxes by the dropper, who operates the arm or lever C', as usual, and in use the machine is run across the field in the manner common to corn-planters of this description, the dropper operating the dropping devices at the proper intervals to drop the seed at the place marked, and the seed so dropped is covered by the wheels, as usual. The front or runner section of the planter is thrown up, as shown in Fig. 10, by the driver placing his foot on the cross-piece E' and bearing down, and when in this position the machine can be run from place to place and out of use, and when in use the runners are dropped down by the driver placing his foot on the treadle H H' and forcing the lever E down; and if the ground is very uneven the pawls or latches I J are both left disengaged, so as to leave a free joint between the front and rear sections, by which the runner-section is free to follow the inequalities of the ground, and if the ground is very soft, and it is desired to hold the runners at a certain dropping-point, the driver engages the pawl I with the proper notch of the plate K to hold the runners at the desired planting depth, and if the ground is full of dead furrows and other depressions, the front or runner section is made to drop into the depressions by disengaging the pawl or latch I and engaging the pawl or latch J with the proper notch of the plate L to suit the amount of drop which it is desired the runner-section shall have, and if the ground is level and no change is desired in the front or runner section it can be locked and held in whatever position required by engaging both of the pawls or latches I J with their ratchet-plates K L, and it will thus be seen that by means of the pawls or latches I J the front or runner section can be adjusted and held in a rigid position, or be left free to rise, or be left free to fall, or be left free to both rise and fall, all of which adjustments are necessary to the proper running and operating of corn-planters.

The placing of the runners at a slight angle enables the same planter to be readily and quickly changed to plant rows at different distances apart, and by using a wheel-hub longer on one side than the other the tread of the wheel can be made to follow directly behind the runner whether planting at the greatest or least distance apart.

The lever E and the connecting link or strap G furnish the means by which the front or runner section of the planter can be raised and lowered, and also the lock by which, when elevated, such section will be held firmly in its elevated position, thus dispensing with the independent locks heretofore used for this purpose.

The straps B and the swinging support D furnish a support for the reciprocating bar and the seed-slides, by which such devices are held suspended, so as to be free to move back and forth with but little, if any, friction, and so as not to have dust or dirt interfere with their movements back and forth.

The latches or pawls and their ratchet-plates can be arranged in some other manner than shown; but the arrangement must be one to coact with the elevating-lever of the front section.

What we claim as new, and desire to secure by Letters Patent, is as follows:

1. The slides A, in combination with the bars B, for suspending the slides and giving them a curvilinear motion to avoid frictional contact, substantially as and for the purpose specified.

2. The slides A and reciprocating bar C, in combination with the suspending-bars B, pivoted to the outside of the seed-boxes, and swinging support D, for preventing friction in the operation of the slide, substantially as specified.

3. The combination, with the lever E and the runner-section of a corn-planter, of the link G, pivoted at one end to the end of lever E and at the other end to the said runner-section, and adapted to be thrown beyond its pivotal center, as set forth, whereby the runner-section may be raised and lowered and locked in its elevated position, substantially as described.

4. The combination of the lever E, the foot-rest E' at the rear end of lever E, the foot-treadle composed of standard H, secured at its lower end to lever E, and provided with cross-piece H', the runner-section, and the link G, pivoted at one end to lever E and at the other end to the runner-section, and adapted to be thrown beyond its pivotal center, substantially as described.

5. The pawl or latch I, pivotally mounted on the foot-lever E, in combination with a ratchet or locking plate, K, for locking the runner-section of a corn-planter against downward movement, and leaving it free to rise, substantially as described.

6. The pawl or latch J, mounted on the lifting foot-lever E, in combination with the ratchet or locking plate L, for locking the runner-section of a corn-planter against a rising movement and allowing it to fall, substantially as described.

7. The pawls or latches I J, pivotally mounted on lifting foot-lever E, and locking or ratchet plates K L, in combination with the front or runner section of a corn-planter, for locking such section in a rigid position, or allowing it to rise and fall freely, substantially as and for the purposes specified.

8. The front or runner section of a corn-planter, in combination with locking pawls or latches for locking the section in a rigid position or allowing it to rise or fall, or to rise and not fall, or to fall and not rise, substantially as and for the purposes specified.

9. The runners M, having an incline or angle in relation to the frame, in combination with the wheel-hubs N, having one side longer than the other, for setting the wheels to follow the runners, substantially as described.

NILS O. STARKS.
JOHN A. JOHNSON.

Witnesses:
W. C. NOÉ,
STORM BULL.